United States Patent [19]

Reinhoudt

[11] 3,855,624

[45] Dec. 17, 1974

[54] GROOVED AIR BEARING HEAD

[75] Inventor: Jacobus Pieter Reinhoudt, Eindhoven, Netherlands

[73] Assignee: U.S. Philips Corporation, New York, N.Y.

[22] Filed: Aug. 15, 1973

[21] Appl. No.: 388,395

[52] U.S. Cl. .................................................. 360/103

[51] Int. Cl. .................................................. G11b 5/60

[58] Field of Search ............................. 360/102, 103

[56] References Cited

UNITED STATES PATENTS

| | | | |
|---|---|---|---|
| 3,131,395 | 4/1964 | Lekas | 340/174.1 E |
| 3,225,338 | 12/1965 | Kelner et al. | 340/174.1 E |
| 3,248,737 | 4/1966 | Thomas, Jr. et al. | 340/174.1 E |
| 3,373,414 | 3/1968 | Carter | 340/174.1 E |
| 3,380,040 | 4/1968 | Liggett et al. | 340/174.1 E |
| 3,398,870 | 8/1968 | Mullan et al. | 340/174.1 E |
| 3,525,987 | 8/1970 | Muijderman et al. | 340/174.1 E |
| 3,631,423 | 12/1971 | Groom | 340/174.1 E |
| 3,729,720 | 4/1973 | Darling | 340/174.1 E |

*Primary Examiner*—Vincent P. Canney
*Attorney, Agent, or Firm*—Frank R. Trifari

[57] ABSTRACT

A device for the processing of data in the form of magnetic recordings on a rotatable recording disc by means of one or more magnetic heads which are accommodated in a head plate which during operation is spaced at a relatively small distance from the disc. The surface of the plate facing the disc is provided with two groove patterns, the geometry of which being selected so that for one specific direction of rotation the summation of the pressures in the gap between plate and disc results in an air bearing having a zero bearing capacity and a high positive rigidity.

4 Claims, 6 Drawing Figures

GROOVED AIR BEARING HEAD

Figure 1:
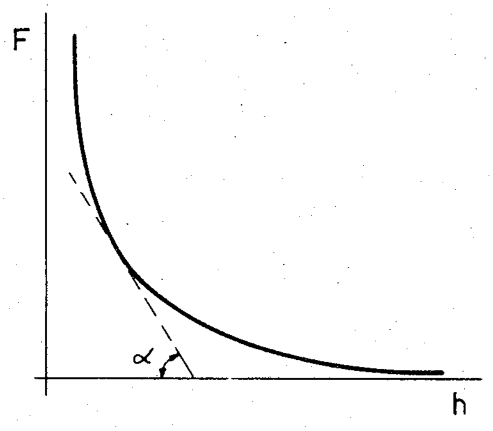

The invention relates to a device for the processing of data in the form of magnetic recordings on a rotatable recording disc with the aid of one or more magnetic heads, which are accommodated in a head plate which during operation is spaced at a relatively small distance from the recording disc, the surface of said plate which faces the recording disc being recessed.

A device of this type is described in German Patent Specification 1,424,430. In the known device the recesses in the head plate are formed by depressions in the plate surface, which at one side terminate in radial grooves, via which during operation the medium, for example air, in which the recording disc and head plate are located, is admitted, so that a certain pressure builds up between the disc and the plate. Such an air bearing between disc and plate possesses a high rigidity and also provides a high bearing capacity. The term "bearing capacity" is defined as the force that must be exerted by the discs toward each other in order to maintain a predetermined small spacing between the discs. The term "rigidity" is defined as the ratio between increasing bearing capacity and decreasing distance between the discs. The high rigidity is favourable, because this permits the recording disc and the head plate to be spaced apart closely, so that a high writing density can be achieved. A drawback of the known device is, that the high ridigity of the air bearing is accompanied by a high bearing capacity, which means that during operation the air bearing should be subjected to a high load by means of additional provisions, in the known device in the form of an electromagnet, whereas during starting of the device steps should be taken to temporarily remove said load. In the known device the latter steps consist in that during starting the electromagnet is not yet energized and a spring which is arranged around the shaft of the recording disc, keeps an armature plate which is mounted on said shaft at a distance from the electromagnet and thus the recording disc at ample distance from the head plate, until upon reaching a speed which suffices to produce the air bearing between the recording disc and the head plate, the electromagnet is energized.

It is an object of the invention to eliminate said drawbacks and to provide a device in which the bearing capacity is eliminated while maintaining a high ridigity of the air bearing at a given design gap height. For this purpose a device of the type mentioned in the preamble is characterized in that said surface of the head plate comprises at least two groove patterns, which during rotation of the recording disc produce opposite pressures in a gap which is present between the recording disc and the head plate during operation, the geometry of the groove patterns being selected so that for one specific direction of rotation one pattern produces a positive bearing capacity, which greatly depends on the gap height, and a high ridigity, whereas the other pattern, whose grooves are deeper than those of said first pattern, provides a negative bearing capacity, which is substantially gap-independent, and a low rigidity, in such a way that for a specific design gap height the sum of the bearing capacities is zero and a high positive rigidity prevails.

Owing to the steps according to the invention a device is obtained in which between the recording disc and the head plate an air bearing is formed, which at a specific pre-selected design gap height has no bearing capacity and hence requires no external loading, while it nevertheless possesses a high positive rigidity. Moreover, the device according to the invention has the advantage that the gap between recording disc and head plate at zero bearing capacity is independent of the RPM of the disc and of the viscosity of the operating medium.

In a suitable embodiment of the invention, the groove patterns are formed in annular, mutually concentric areas, the groove pattern which provides the bearing capacity which greatly depends on the gap height being formed in an outer ring and the other groove pattern in an inner ring. This ensures that the facing surfaces of the recording disc and the head plate are not tilted with respect to each other.

Preferably the groove depth of the pattern, which provides the bearing capacity which is greatly dependent on the gap height, substantially equals the design gap height, whereas the groove depth of the other pattern is at least five times the depth of said first pattern. In a suitable embodiment of the invention the grooves take the form of spiral grooves, two groove patterns being provided and the spiral grooves of the two patterns being curved oppositely.

An embodiment of the invention is described in more detail, by way of example, with reference to the drawing.

FIG. 1 shows a graph of the relationship between bearing capacity and gap height for the air bearing produced in the known device.

Figures 2, 4:
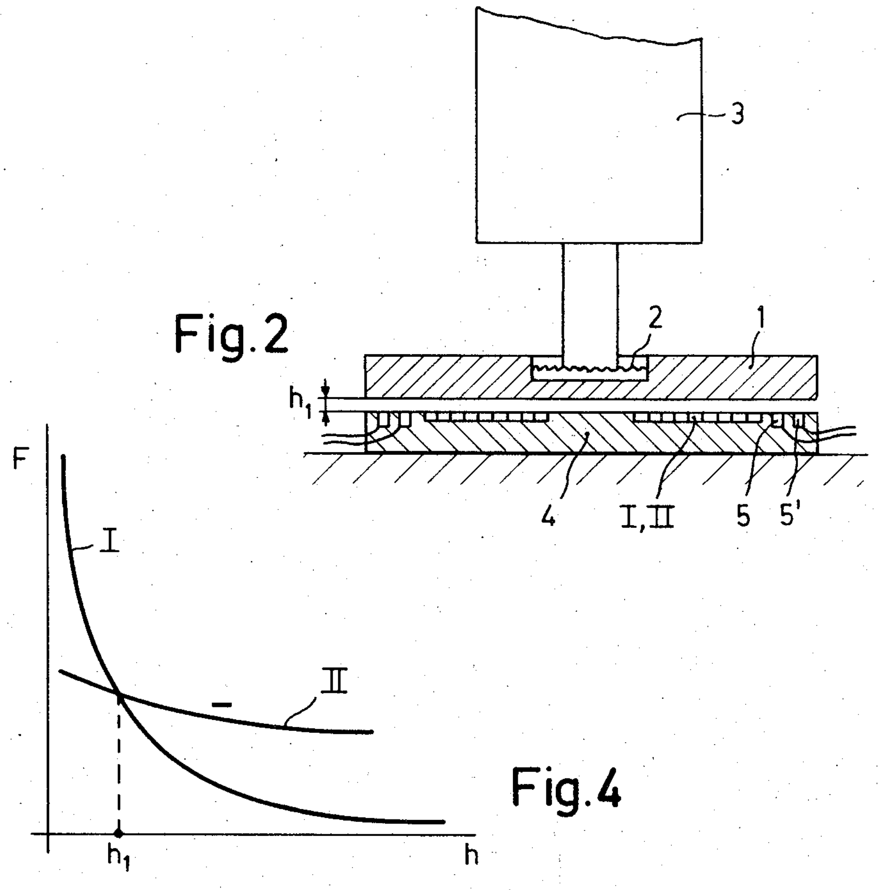
Figure 3A:
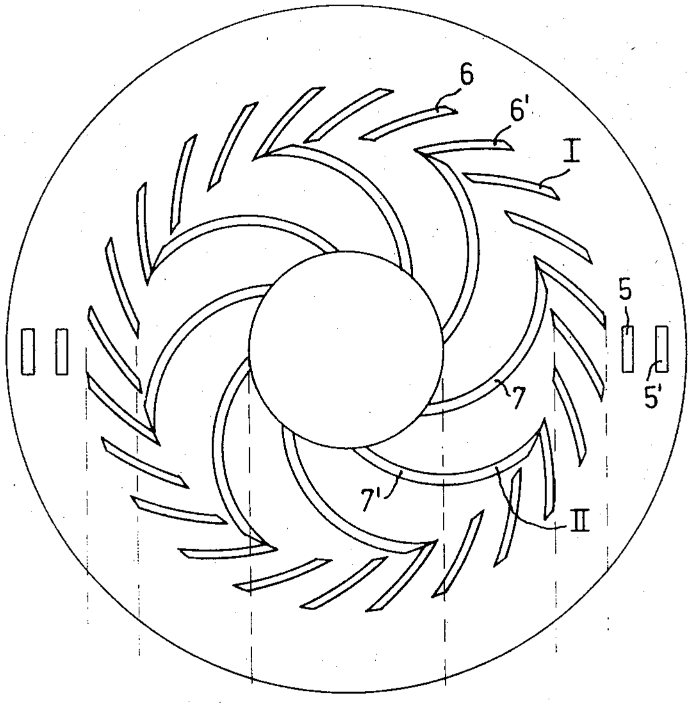
Figure 3B:
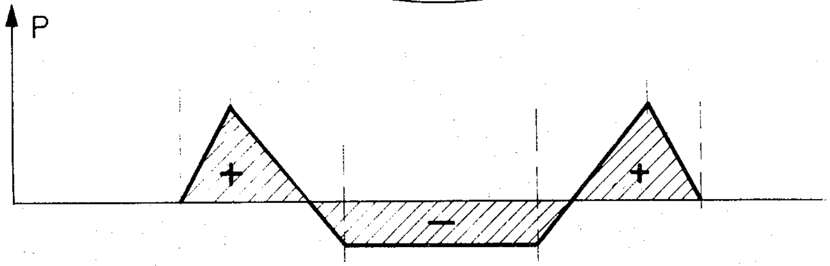
Figure 5:
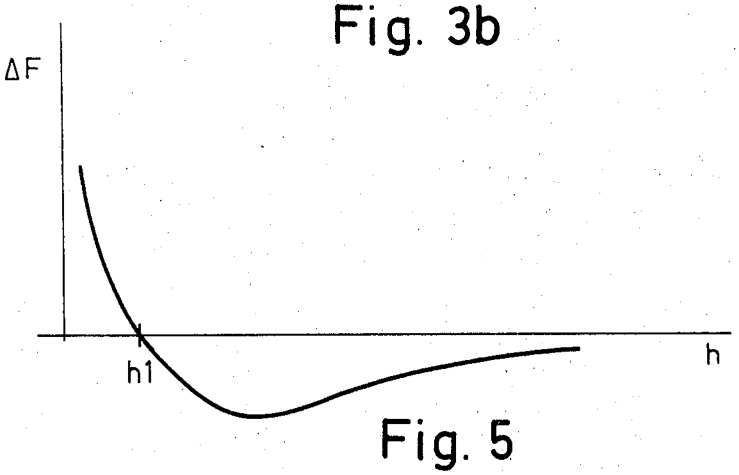

FIG. 2 schematically shows a device according to the invention,

FIG. 3*a* is an elevation, at an enlarged scale of the head plate which is employed in the device according to FIG. 2, FIG. 3*b* represents the variation of the pressure of the operating medium over the head plate of FIG. 3*a*, FIG. 4 shows the relationship between bearing capacity and gap height for each of the two groove patterns of the head plate shown in FIG. 3*a*, and FIG. 5 shows the relationship between bearing capacity and gap height resulting from FIG. 4, as existing in a device according to the invention.

In a disc memory unit as described in said German Patent Specification 1,424,430, a relationship exists between the bearing capacity F of the air bearing formed between the recording disc and head plate during operation and the gap height h between the said disc and plate, which is shown i FIG. 1. The tangent of an angle $\alpha$, which is enclosed by a tangent to the Fh-curve and the h-axis is a measure of the rigidity of the air pad at the value of the gap height associated with the tangent point. To obtain a high writing density the gap height *h* is to be minimized. It follows from FIG. 1 that at a relatively small gap height the bearing capacity and the rigidity of the air pad will be high. The high regidity is favourable, because the gap height is then hardly affected by load variations. However, the high bearing capacity which is accompanied by a high rigidity is a drawback, because the air pad must be subjected to correspondingly high external loading forces.

The device according to the invention shown in FIG. 2 comprises a recording disc 1, which by means of a flexible diaphragm coupling 2 is disposed on the shaft of a motor 3. The surface of the disc 1 which faces away from the motor is coated with a magnetic material in a known manner, not shown. The recording disc 1 faces a head plate 4, which accommodates one or more magnetic heads 5, 5' . . . . In the surface of the head plate 4 which faces the disc 1 two groove patterns I, II are formed, which are shown in more detail in FIG. 3*a*. As appears from this Figure, the patterns I, II are located in circular, concentric areas.

The groove pattern I comprises a number of grooves 6, 6' . . . , whose geometry is selected so that for one specific direction of rotation of the recording disc this pattern provides a positive bearing capacity, which is highly dependent on the gap height, and a high rigidity (see curve I in FIG. 4). The grooves 6, 6', . . . are spiral grooves and the depth of the grooves substantially equals a predetermined design gap height $h_1$, which is for example of the order of 2 $\mu$um.

The groove pattern II comprises a number of spiral grooves 7, 7', . . . which relative to the grooves 6, 6', . . . are curved oppositely and whose groove depth is at least five times the depth of the grooves 6, 6', . . . , so that the pattern II is substantially gap-independent. The geometry of the groove pattern II is selected so that for the above-stated, specific rotating direction this pattern yields a negative bearing capacity and a low rigidity (see curve II in FIG. 4).

During operation the groove patterns produce opposite pressures in the gap between the recording disc and head plate, the variation of which is shown in FIG. 3*b*.

The effect which is eventually obtained by means of the groove patterns I and II according to the invention, appears from FIG. 5 which represents the summation of the two curves shown in FIG. 4. From FIG. 5 it appears that in the device according to the invention the resultant bearing capacity ΔF equals zero at the design gap height h1, while at either side of this point, i.e. both for positive and negative bearing capacities, a high positive rigidity prevails. Hence, the bearing capacity is eliminated in the air bearing according to the invention while maintaining a high positive rigidity. The shape of the curve shown in FIG. 5 is independent of the viscosity of the medium in which the recording disc rotated and independent of the speed of the disc. In the stop position of the device of FIG. 2 there is no objection against the recording disc resting against the head plate. When the recording disc is made to rotate, the disc will almost immediately move towards the operating position, which is determined by the "hard" design gap $h_1$.

What is claimed is:

1. A device for the processing of data in the form of magnetic recordings on a rotatable recording disc by means of one or more magnetic heads, which are accommodated in a head plate which during operation is spaced at a relatively small distance from the recording disc, the surface of said plate which faces the recording disc being recessed, characterized in that said surface of the head plate comprises at least two groove pattern means, for producing opposite pressures during rotation of the recording disc in a gap which is present between the recording disc and the head plate during operation, the geometry of one of the groove pattern means comprising means for providing a positive bearing capacity which greatly depends on the gap height, and a high rigidity, for one specific direction of rotation one pattern whereas the geometry of the other pattern, having deeper grooves than those of said first pattern, comprises means for providing a negative bearing capacity, which is substantially gap-independent, and a low rigidity for said one direction of rotation, whereby for a specific design gap height the sum of the bearing capacities is zero and a high positive rigidity prevails.

2. A device as claimed in claim 1, characterized in that the groove patterns are located in annular, mutually concentric areas, the groove pattern which provides the bearing capacity which greatly depends on the gap height being formed in an outer annular area and the other groove pattern in an inner annular area.

3. A device as claimed in claim 1, characterized in that the groove depth of the pattern which produces the bearing capacity which greatly depends on the gap height, substantially equals the design gap height whereas the groove depth of the other pattern is at least five times the depth of said first pattern.

4. A device as claimed in claim 1, characterized in that the grooves are spiral grooves, two groove patterns are provided and the spiral grooves of the two patterns are curved oppositely.

* * * * *

PO-1050
(5/69)

UNITED STATES PATENT OFFICE
CERTIFICATE OF CORRECTION

Patent No. 3855624 Dated December 17, 1974

Inventor(s) JACOBUS PIETER REINHOUDT

It is certified that error appears in the above-identified patent and that said Letters Patent are hereby corrected as shown below:

In the heading:

After "[21] Appl. No." insert

--[30] FOREIGN APPLICATION PRIORITY DATA

Sept. 29, 1972 Netherlands ......7213193--

Column 2, line 49, "shown i Fig. 1" should be

--shown in Fig. 1--

Column 4, line 19 after "rotation" insert --,-- (comma)

line 20, cancel "one pattern" (at the beginning of the line).

Signed and sealed this 22nd day of April 1975.

(SEAL)
Attest:

RUTH C. MASON
Attesting Officer

C. MARSHALL DANN
Commissioner of Patents
and Trademarks